United States Patent [19]

Trella

[11] 4,200,995

[45] May 6, 1980

[54] JOINT CONSTRUCTION FOR SKELETAL MODEL

[76] Inventor: Phyllis L. Trella, 2264 Calle Iglesia, Mesa, Ariz. 85202

[21] Appl. No.: 909,533

[22] Filed: May 25, 1978

Related U.S. Application Data

[63] Continuation-in-part of Ser. No. 772,579, Feb. 28, 1977, abandoned.

[51] Int. Cl.² ............................................. G09B 23/34
[52] U.S. Cl. .......................................... 35/17; 46/22; 46/161
[58] Field of Search ............... 35/17, 16, 18 A; 46/25, 46/161, 173

[56] References Cited

U.S. PATENT DOCUMENTS

| | | | |
|---|---|---|---|
| 983,547 | 2/1911 | Fleck | 35/17 |
| 2,108,229 | 2/1938 | Metz | 35/17 |
| 2,197,975 | 4/1940 | Fleet | 35/17 |
| 2,649,806 | 8/1953 | Monaghan | 46/173 |
| 2,662,235 | 12/1953 | Calverley | 46/161 X |
| 2,725,234 | 11/1955 | Coble | 273/157 R |
| 2,995,833 | 8/1961 | Bezark | 35/17 |

OTHER PUBLICATIONS

Pop-em Alphabet Blocks, Gerber Toy Line, Catalog for 1966.
Stansi Scientific Division Catalog, Feb. 1969, p. 40.
Welch Scientific Apparatus And Supplies, Catalog p. 686.

*Primary Examiner*—Harland S. Skogquist
*Attorney, Agent, or Firm*—Alter & Weiss

[57] ABSTRACT

A movable joint construction of human or animal skeletons in which simulated skeletal members are formed of a deformable plastic material capable of deforming sufficiently to permit a connector member formed integrally with one of the skeletal members to be snappably received within and retained within a socket portion formed in the mating surface of the other skeletal member. In a preferred embodiment, at least one of the skeletal members is provided with a simulated cartilage portion on an outer surface adjacent to the area of snap-fit connection with other juxtaposed adjacent skeletal members to thereby simulate the appearance and function of cartilage positioned between the bone members. In another embodiment, separate cartilage members are provided with connector members on either side thereof to be capable of being snappably received within and retained by connection means so as to be positioned between the two skeletal members.

10 Claims, 15 Drawing Figures

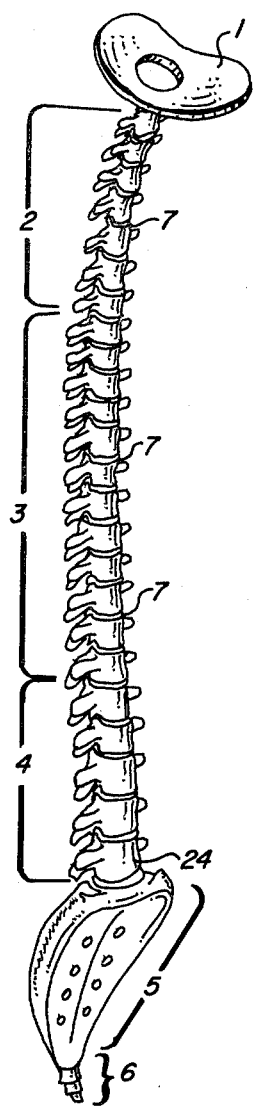
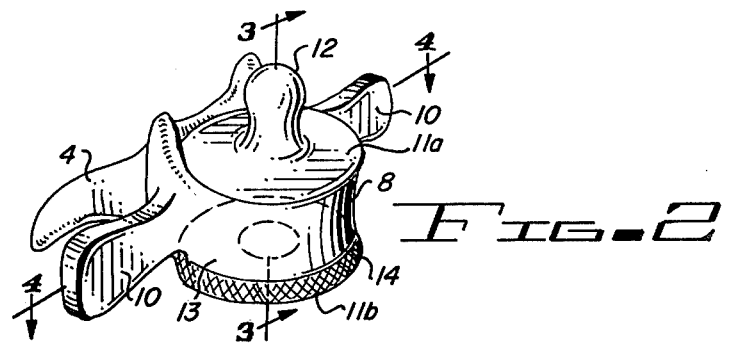
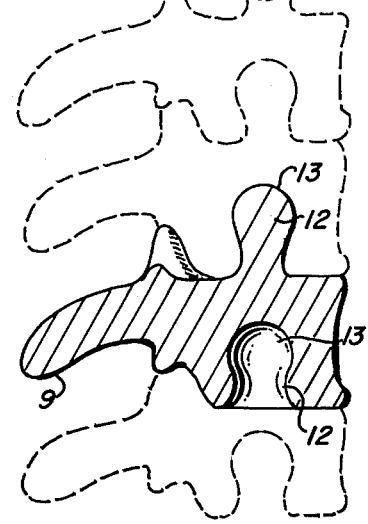
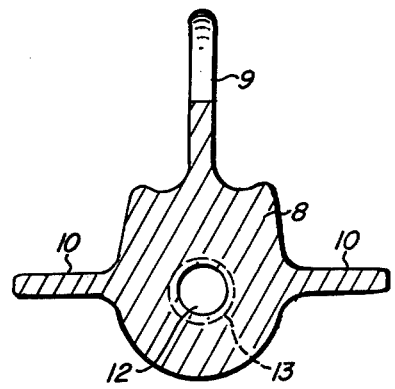
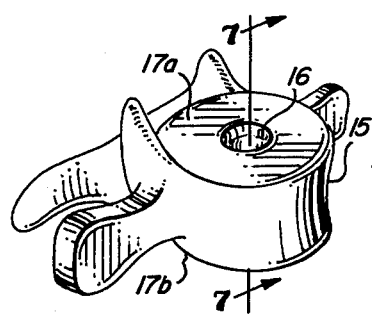
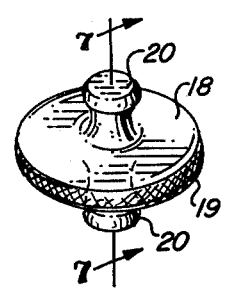
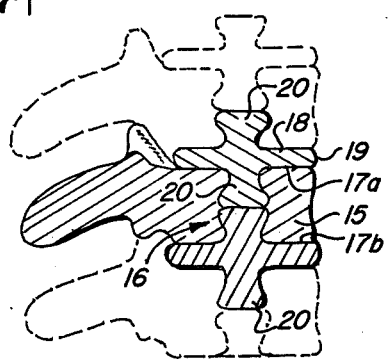

JOINT CONSTRUCTION FOR SKELETAL MODEL

BACKGROUND OF THE INVENTION

This is a continuation-in-part-application of my earlier-fluid presently co-pending application, Ser. No. 772,579, filed Feb. 28, 1977, which is now abandoned.

This invention relates in general to educational and instructional models and in particular to a joint construction for skeletal models which simulates the shape, co-operation and connection of the elements of a human or animal skeleton.

In a further respect, the invention pertains to movable joint constructions for representing the skeletal elements and for simulating the various joints of a human or animal skeleton, which are further adapted to proximately simulate the relative movement between two or more such skeletal members as arises out of the bending action of the human spine, a knee or shoulder joint, for example.

Except for very expensive models of human or animal skeletons, which are usually found only in museums, medical schools and the like, most skeleton models are either constructed with the skeletal members such as bones and cartilage, etc. in fixed relative positions or, if the skeletal members are movable relative to one another, they may not accurately depict the normal movement as it actually occurs in a human or animal body.

For the purpose of enabling doctors to illustrate normal joint movements for their patients, and for other educational or hobby pursuits, it would be highly advantageous to provide a joint construction for a skeletal model which is formed of economical materials and which can be mass produced. Additionally, it would be advantageous to provide such a skeletal model which can be rapidly, correctly and conveniently assembled and disassembled for educational or entertainment purposes.

Accordingly, it is an object of the present invention to provide an improved joint construction for skeletal models which accurately exemplifies and demonstrates actual skeletal members and co-operation between the elements of a human or animal skeleton system.

Another object of the invention is to provide such a novel joint construction which will permit the economical and rapid production of skeletal models for sale at a cost lower than the present cost of skeletal models which attempt to simulate skeletal joint actions.

Yet another object of the invention is to provide a novel joint construction for skeletal models which permits one to rapidly and conveniently assemble and disassemble the entire skeleton or major parts thereof.

These and other, further and more specific objects and advantages of the invention will become apparent from the following disclosure, taken in conjunction with the drawings.

SUMMARY OF THE INVENTION

The present invention comprises a movable joint construction for skeletal models having a plurality of simulated skeletal members each having one or more mating surfaces. Each of the skeletal members corresponds to a single skeletal element of a real skeletal system which the model construction simulates. To facilitate attachment from one skeletal member to an adjacent skeletal member, independent of prior or subsequent member attachment, each of the skeletal members is fashioned out of a deformable plastic material with connection means formed integrally therein.

The connection means are capable of snappably attaching one of the skeletal members to a second adjacent skeletal member at their respective mating surfaces. Through the utilization of such connection means, their positioning and dimensioning, relative movement is obtained between the skeletal members in a manner characteristic to the action of the real skeletal elements being simulated by the construction.

The preferred embodiment of the invention includes the incorporation of simulated cartilage portions proximate to the respective mating surfaces of such adjacent skeletal members. These skeletal members thus sandwich the cartilage portion between them when the skeletal members are snappably attached to one another.

In this preferred embodiment of the invention, the connection means comprises a plurality of emanating connector members as well as a plurality of receiving socket portions capable of snappably receiving the respective connector member of an adjacent skeletal member.

In one embodiment, each of the skeletal members has one emanating connector member on a first side and one socket portion on a second opposite side. The emanating connector member on the first side enables attachment into the socket portion of a second adjacent skeletal member, while the socket portion on the second side of the skeletal member enables attachment of yet a third skeletal member by snappably receiving the connector member of that third skeletal member.

In another embodiment, the simulated cartilage portions are independent cartilage members having mating surfaces with connection means emanating therefrom so as to enable snappable attachment to each of two adjacent skeletal members so as to be sandwiched therebetween. The connection means associated with such an embodiment comprises the cartilage members having a series of receiving socket portions. The skeletal members utilise a series of emanating connector members which snap into a corresponding one of said socket portions. Such a construction precludes the inadvertent attempt to attach skeletal members together without an appropriate cartilage portion positioned therebetween.

The invention further embodies the utilization of emanating connector members as the connection means integrated into the cartilage members. In equivalent fashion, the skeletal members utilize a series of socket portions capable of accepting snappable receipt of a corresponding one of connector members in the cartilage member.

In yet another embodiment, the simulated cartilage portion is integrally formed as part of one or more of the juxtaposed skeletal members. It is anticipated that the invention covers the utilization of such an integrally formed cartilage portion on the mating surface of one of two adjacent skeletal members or alternatively the cartilage portion may be integrally formed on both mating surfaces of each of the two adjacent skeletal members.

A preferred adaptation of the invention is directed towards modeling the spine of a human or animal in which the skeletal members simulate the vertebrae and occiput of the spine. In such an adaptation or embodiment, the vertebrae of the model spine are of different colors in order to provide indicia as to the proper placement and role of the vertebrae within the spine construction. Additionally, or as an alternative, the connector-socket pairs are dimensioned to limit snappable connection between one vertebra and only one other adjacent skeletal member. Such differentiated connection means dimensioning precludes the attachment of one of the vertebra with a second non-corresponding vertebra so as to insure the proper arrangement of adjacent vertebrae.

It should be realized that in any of the embodiments so described, the connection means may be of the hinge type or ball-in-socket type.

BRIEF DESCRIPTION OF THE DRAWINGS

FIG. 1 is a perspective view of a model of the human spine constructed in accordance with the principles of the present invention;

FIG. 2 is a perspective view of one of the simulated vertebrae of the model of FIG. 1;

FIG. 3 is a cross-sectional view of the simulated vertabrae of FIG. 2 taken along lines 3—3 and looking in the direction of the arrows, shown in assembly with adjacent simulated vertabrae (indicated by dashed lines).

FIG. 4 is a cross-sectional view of the vertabrae of FIG. 2, taken along line 4—4 and looking in the direction of the arrows;

FIG. 5 shows an alternate embodiment of the vertabrae of FIG. 2 for utilization with separate simulated cartilage members;

FIG. 6 is a simulated cartilage element for use in conjunction with the alternate form of the vertebrae of FIG. 5;

FIG. 7 is a cross-sectional view of an assembly of the vertebrae of FIG. 5 with the cartilage element of FIG. 6, taken along section lines 7—7 of FIGS. 5 and 6 and looking in the direction of the arrows;

DETAIL DESCRIPTION OF THE DRAWINGS

Figure 8:
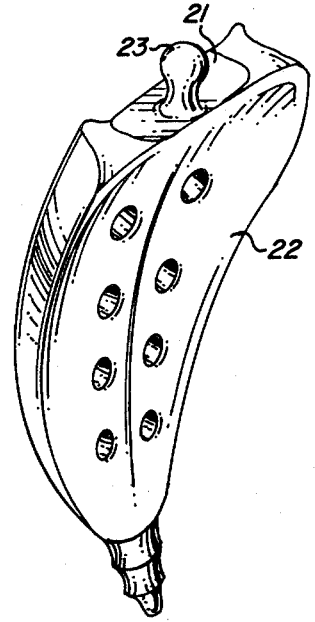
FIG. 8 is a perspective view of a stylized sacrum-coccyx portion of the model spinal assembly of FIG. 1.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

FIG. 1 of the drawings is a perspective view of a model of the human spinal column incorporating the present invention. As will be appreciated by those skilled in the art, FIG. 1 depicts a model of a human spinal column consisting of the occiput 1, the seven cervical vertebrae 2, the twelve thoracic vertebrae 3, the five lumbar vertebrae 4, the five sacral vertebrae 5 (fused as one) and the cocygeal vertebrae 6 (a fusion of four small vertebrae), joined by intervening cartilages 7.

The model human spinal column of FIG. 1 is constructed in accordance with one of the presently preferred embodiments of the invention by providing model vertebrae members as illustrated in FIGS. 1–4 which consists of a molded body portion 8 provided with a simulated spinous process 9 and transverse processes 10. The body portion 8 is provided with mating surfaces 11a and 11b on the upper and lower portions thereof. The upper surface 11a is provided with an upstanding connector member in the form of the ball portion of a ball and socket joint, while the lower surface 11b is provided with a recessed socket portion 13 which snappably receives and retains therewithin the ball portion 12 of the next adjacent simulated vertebrae member as shown in FIG. 3.

As illustrated in FIG. 2, according to one preferred embodiment of the invention, the body portion 8 of the simulated skeletal member (in this case, a vertebra) is provided with a simulated cartilage finish 14 on a portion of the external surface of the body member 8 proximate the mating surface 11b thereof such that when a plurality of the simulated skeletal members 8 are assembled as shown in FIGS. 1 and 3, they will be appropriately separated by cartilage portions.

An alternate method of achieving the interpositioning of the cartilage between the skeletal members is depicted in FIGS. 5–7. Bone element 15 is shown having a socket 16 (or a pair of separate sockets) formed in the top mating surfaces 17a and the bottom mating surface 17b thereof. The simulated vertebrae members 15 are joined together to form the skeletal column as shown in FIG. 1 by means of a simulated cartilage element 18 which is substantially a circular disk, the edge portion 19 of which is textured and/or colored to simulate the appearance of a cartilage and dimensioned to be approximately positioned between the vertebrae as in a real spine. A connector member 20 is formed integrally with the disk member 18 and extends upwardly and downwardly therefrom to form a series of ball connectors which is received within and retained within the sockets 16 of the simulated vertebrae member 15, and an adjacent vertebrae, all as shown more fully in FIG. 7. Moreover, it should be realized that ball connectors may be utilized on the vertebrae, with sockets in the cartilage member in order to equivalently enable snappable attachment.

Figure 9:
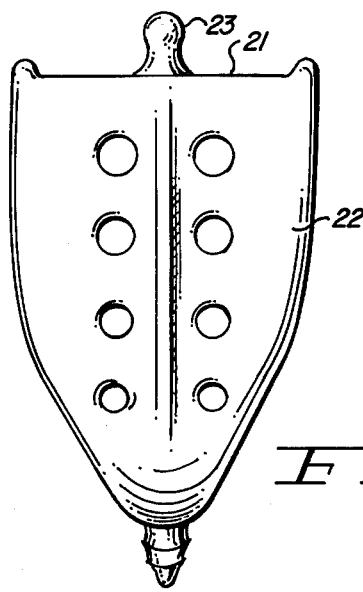
FIG. 9 is a plan view of the stylized sacrum-coccyx portion of FIG. 8.

FIGS. 8 and 9 depict the sacrum/coccyx assembly (reference characters 5 and 6 of FIG. 1). As will be noted, the upper mating surface 21 of the assembly 22 is provided with an upstanding connector member 23 in the form of a ball which mates with a socket formed in the underside of the last of the lumbar vertebrae (reference character 24, FIG. 1).

Figure 10:
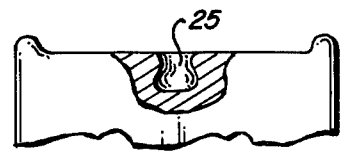
FIG. 10 is a partial sectional view of an alternate stylized sacrum-coccyx member for use in connection with a spinal column model formed by assembling the model vertebrae and cartilage elements of FIGS. 5 and 6.

FIG. 10 is a partial sectional view showing the upper edge of a sacrum/coccyx assembly suitable for use with the separate cartilage elements of FIG. 6 and being provided with a socket 25 to receive and retain the lower connector member 20 (FIG. 7) of the cartilage element which separates the sacrum/coccyx assembly from the lowermost lumbar vertebrae 24.

Figure 11:
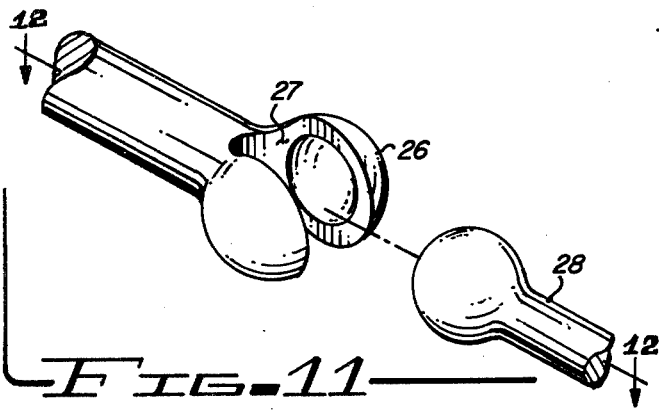
FIG. 11 is a perspective view of a skeletal joint model which simulates the action of the human elbow.
Figure 12:
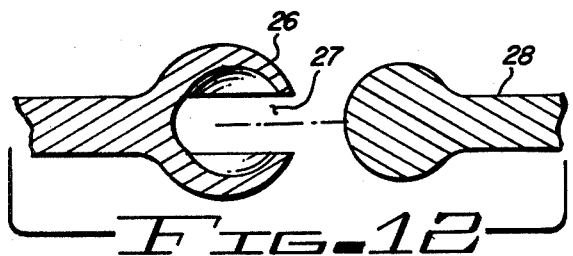
FIG. 12 is a cross-sectional view of the joint conctruction of FIG. 11, taken along section lines 12—12 thereof.

FIGS. 11 and 12 illustrate the presently preferred method of fabricating a joint assembly which accurately duplicates the relative movement of the bone elements in the human elbow. The socket portion 26 is provided with a notch 27 which permits movement of the arm 28 in the vertical plane and virtually no movement in the horizontal plane. However, the arm can be rotated within the socket.

Figure 13:
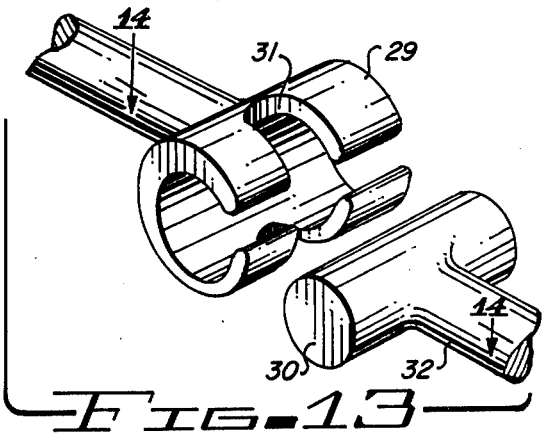
FIG. 13 is a perspective view of a skeletal joint model which simulates the action of the human knee.
Figure 14:
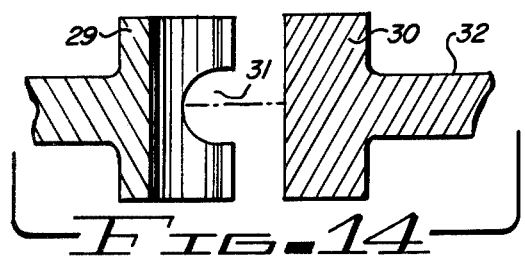
FIG. 14 is a cross-sectional view of the simulated knee joint of FIG. 13, taken along section line 14—14 thereof.

FIGS. 13 and 14 depict a joint construction which accurately depicts the relative movement of the bones in the human knee. The socket member 29 is cylindrically shaped to receive a cylindrically shaped connector member 30. The socket member 29 is provided with a slot 31 which permits movement in the vertical plane but no relative movement in the horizontal plane and the shaft member 32 cannot be rotated.

Figure 15:
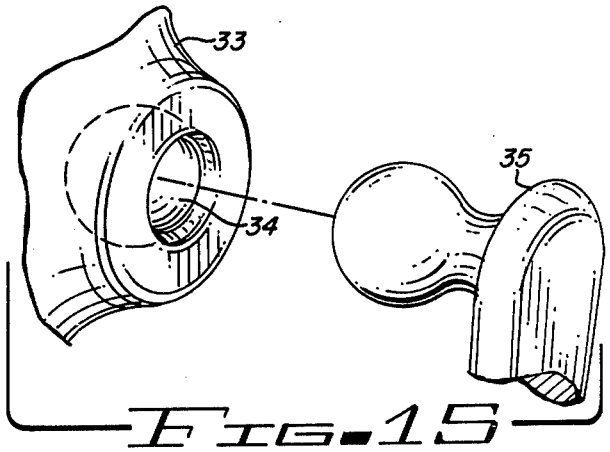
FIG. 15 is a model joint which simulates the action of a human shoulder of hip joint.

Finally, FIG. 15 illustrates a joint construction which fairly accurately represents the relative movement of the bones in the human shoulder or hip joint. The skeletal member 33 is provided with a socket 34 and is sized to permit relative movement of the leg or arm model 35 in all planes.

The bone and cartilage elements utilized in forming the skeletal model as described above can be fabricated from any suitably resiliently deformable material, such as polyethylene, polypropylene, soft rubbers and the like.

In order to facilitate the proper arrangement of the vertebrae of the spine model, for example, one embodiment of the invention encompasses the utilization of specific colors for the different types of vertebrae. For example, all of the cervical vertebrae would be of one color while the lumbar vertebrae would be of another. Alternatively different colors could be be used to denote the positions along the spine where greater or lesser curvature flex is alpplied by the human or animal. In yet another embodiment differently sized socket-connector pairs are utilized so as to limit attachment to only the correct adjacent pairs of vertebrae.

The foregoing description and drawings merely explain and illustrate the invention and the invention is not limited thereto except insofar the amended claims are so limited, as those skilled in the art and have the disclosure before them will be able to make modifications and variations thereto without departing from the scope of the invention.

What is claimed is:

1. A movable joint construction for skeletal models, said construction comprising:
   a plurality of simulated skeletal members each of which having one or more mating surfaces,
   each of said skeletal members corresponding to a single skeletal element of a real skeletal system which said construction simulates,
   each said skeletal member further fashioned of a deformable plastic material with connection means formed integrally therein,
   said connection means capable of snappably attaching one of said skeletal members to a second adjacent skeletal member at said respective mating surfaces,
   said connection means comprising a plurality of emanating connection members and a plurality of receiving socket portions capable of snappably receiving said respective connector members of an adjacent skeletal member,
   said connection means positioned and dimensioned to permit relative movement between said skeletal members in a manner characteristic to the action of the real skeletal elements being simulated thereby;
   at least one of said first or second adjacent skeletal members having proximate its respective mating surfaces thereof a simulated cartilage portion,
   said simulated cartilage portion being integrally formed as part of one or more of said plurality of simulated skeletal members,
   said adjacent skeletal members sandwiching said cartilage portion therebetween when said one skeletal member is snappably attached to said second skeletal member.

2. The invention according to claim 1 in which said connection means are of the hinge type.

3. The invention according to claim 1 in which said first skeletal member has one of said emanating connector members on a first side for attachment to said second skeletal member,
   said second skeletal member having a corresponding socket portion to receive said connector member,
   said first skeletal member having on a second opposite side a socket portion for attaching said first skeletal member to a third skeletal member through the snappable receipt of a connector member of said third skeletal member into said socket portion of said first skeletal member.

4. The invention according to claim 1 in which said simulated cartilage portion comprises an independent cartilage member having mated surfaces with connection means emanating therefrom so as to enable snappable attachment to each of said first and second skeletal members therebetween.

5. The invention according to claim 4 in which said connection means in said cartilage member comprises a series of receiving socket portions,
   said skeletal members having a series of emanating connector members which snap into a corresponding one of said socket portions.

6. The invention according to claim 4 in which said connection means in said cartilage member comprises a series of emanating connector members,
   said skeletal members having a series of socket portions which enables snappable receipt into a corresponding one of said connector members.

7. The invention according to claim 1 in which said connection means are of the ball-in-socket type.

8. The invention according to claim 1 in which said joint construction comprises a model of a human or animal spine.

9. The invention according to claim 8 in which different vertebrae of said spinal skeletal model construction are of different colors in order to provide indicia as to the proper placement and role of said vertebrae within said spine construction.

10. The invention according to claim 8 in which adjacent connector member-socket portion pairs are of a dimension to enable snappable receipt and connection with one another only,
    said different dimensions precluding the attachment of one of said vertebrae with a second non-corresponding vertebrae so as to insure the proper alignment of adjacent vertebrae.

* * * * *

UNITED STATES PATENT AND TRADEMARK OFFICE
CERTIFICATE OF CORRECTION

PATENT NO. : 4,200,995
DATED : May 6, 1980
INVENTOR(S) : Phyllis L. Trella

It is certified that error appears in the above-identified patent and that said Letters Patent are hereby corrected as shown below:

Column 1, line 6 — Delete "fluid" and insert instead --filed--.

Column 5, line 31 — Delete second "be".

Column 5, line 33 — Delete "alpplied" and insert instead --applied--.

Signed and Sealed this

Twenty-sixth Day of August 1980

[SEAL]

Attest:

*Attesting Officer*

SIDNEY A. DIAMOND

*Commissioner of Patents and Trademarks*